Sept. 22, 1970 S. R. OVSHINSKY 3,530,441

METHOD AND APPARATUS FOR STORING AND RETRIEVING INFORMATION

Filed Jan. 15, 1969

3 Sheets-Sheet 1

(Pulse Width ≥ 1 millisecond)

(Pulse width ≤ 10 microseconds)

Inventor
Stanford R. Ovshinsky
By: Wallenstein, Spangenberg, Hattis & Strampel, Attys

METHOD AND APPARATUS FOR STORING AND RETRIEVING INFORMATION

Filed Jan. 15, 1969 3 Sheets-Sheet 2

Inventor
Stanford R. Ovshinsky

By: Wallenstein, Spangenberg, Hattis & Strampel attys.

Inventor
Stanford R. Ovshinsky

By: Wallenstein, Spangenberg, Hattis & Strampel attys.

3,530,441

METHOD AND APPARATUS FOR STORING AND RETRIEVING INFORMATION

Stanford R. Ovshinsky, Bloomfield Hills, Mich., assignor to Energy Conversion Devices, Inc., Troy, Mich., a corporation of Delaware Continuation-in-part of application Ser. No. 754,607, Aug. 22, 1968. This application Jan. 15, 1969, Ser. No. 791,441
Int. Cl. G11c *11/34, 13/00, 13/04*
U.S. Cl. 340—173 58 Claims

ABSTRACT OF THE DISCLOSURE

In storing and retrieving information, a film or layer of memory semiconductor material is utilized wherein the layer is capable of having desired discrete portions thereof reversibly structurally altered between one stable atomic structure condition having a high resistance or insulating condition characteristic and another stable atomic structure condition having a low resistance or conducting characteristic, the layer normally being in one condition. Energy is selectively applied to said layer at desired discrete portions thereof for altering said layer at said desired discrete portions from said one normal condition to the other condition to store desired information in said layer. The conditions of said desired discrete portions of said layer are detected with respect to said one normal condition of the remainder of said layer to retrieve the desired information stored in said layer. The retrieval of the stored information is nondestructive and the information remains stored until erased by applying energy to the layer to realter the condition of said desired discrete portions of said layer to the normal condition thereof. The layer may have adaptive memory of its conditions, that is, the high resistance and low resistance conditions may be varied as desired. Producing the desired discrete portions of information in the memory semiconductor material and the realteration thereof to the normal condition are accomplished in various ways and also the detection and retrieval of the information are accomplished in various ways.

This application is a continuation-in-part of application Ser. No. 754,607, filed Aug. 22, 1968, now abandoned.

The principal object of this invention is to provide new and improved methods and apparatuses for storing and retrieving information.

Briefly, for example in accordance with this invention, there is utilized a deposited film or layer of memory semiconductor material which is capable of having desired discrete portions thereof reversibly altered between a stable high resistance or insulating condition and a stable low resistance or conducting condition. The deposited film or layer of the memory semiconductor material utilized in this invention can normally be in its stable high resistance or insulating condition or in its stable low resistance or conducting condition, as desired.

Assuming the film or layer to be in its stable high resistance condition, desired discrete portions thereof may be altered to a stable low resistance condition by energy applied thereto which can be in the form of energy pulses of sufficient duration (e.g. 1–100 milliseconds or more) to cause the alteration to the low resistance condition to take place and be frozen in. Such desired discrete portions may be realtered to the stable high resistance condition by energy applied thereto which can be in the form of energy pulses of short duration (e.g. 10 microseconds or less) to cause the realteration to the high resistance condition to take place and be frozen in.

Conversely, assuming the film or layer to be in its stable low resistance condition, desired discrete portions thereof may be altered to a stable high resistance condition by energy applied thereto which can be in the form of energy pulses of short duration (e.g. 10 microseconds or less) to cause the alteration to the high resistance condition to take place and be frozen in. Such desired discrete portions may be realtered to the stable low resistance condition by energy applied thereto which can be in the form of energy pulses of sufficient duration (e.g. 1–100 milliseconds or more) to cause the realteration to the low resistance condition to take place and be frozen in.

The reversible alteration of desired discrete portions of the layer or film of the memory semiconductor material between the high resistance or insulating condition and the low resistance or conducting condition can involve configurational and conformational changes in atomic structure of the semiconductor material which is preferably a polymeric type structure, or charging and discharging the semiconductor material with current carriers for producing a change in atomic structure wherein such changes in atomic structure freeze in the charged conditions. These structural changes, which can be of a subtle nature, may be readily effected by applications of various forms of energy at the desired discrete portions of the layer or film and they can produce and store information in various modes which may be readily read out or retrieved. It has been found, particularly where changes in atomic structure are involved, that the high resistance and low resistance conditions are substantially permanent and remain until reversibly changed to the other condition by the appropriate application of energy to make such change.

In its stable high resistance or insulating condition, the memory semiconductor material (which is preferably a polymeric material) is a substantially disordered and generally amorphous structure having local order and/or localized bonding for the atoms. Changes in the local order and/or localized bonding which constitute changes in atomic structure, i.e. structural change, which can be of a subtle nature, provide drastic changes in the electrical characteristics of the semiconductor material, as for example, resistance, capacitance, dielectric constant, charge retention and the like, and in other characteristics, such as, index of light refraction, surface reflectance, light absorption, light transmission, particle scattering and the like. These changes in these various characteristics may be readily used in determining or detecting the structure of the desired discrete portions with respect to that of the remaining portions of the layer or film of semiconductor material for reading out or retrieving the information stored therein.

The changes in local order and/or localized bonding, providing the structural change in the semiconductor material, can be from a disordered condition to a more ordered condition, such as, for example, toward a more ordered crystalline like condition. The changes can be substantially within a short range order itself still involving a substantially disordered and generally amorphous condition, or can be from a short range order to a long range order which could provide a crystalline like or psuedo crystalline condition, all of these structural changes involving at least a change in local order and/or localized bonding and being reversible as desired. Desired amounts of such changes can be effected by applications of selected levels of energy.

The aforementioned alterations can be effected in various ways, as by energy in the form of electric fields, radiation or heat, or combinations thereof, the simplest being the use of heat. For example, where energy in the form of voltage and current is used, both electric fields and heat can be involved. Where energy in the form of electromagnetic energy, such as, photoflash lamp light, is used both radiation and heat can be involved. Where energy in the form of particle beam energy, such as electron or proton beams, is used, in addition to heat, there can also be involved a charging and flooding of the semiconductor material with current carriers. Since heat energy is the simplest to use and explain, this invention will be considered below by way of explanation in connection with the use of such heat energy, it being understood that other forms of energy may be used in lieu thereof or in combination therewith within the scope of this invention.

When energy in the form of energy pulses of relatively long duration is applied to desired discrete portions of a film or layer of the memory semiconductor material in its stable high resistance or insulating condition, such portions are heated over a prolonged period and changes in the local order and/or localized bonding occur during this period to alter the desired discrete portions of the semiconductor material to the stable low resistance condition which is frozen in. Such changes in the local order and/or localized bonding to form the stable low resistance condition can provide a more ordered condition, such as, for example, a condition toward a more ordered crystalline like condition, which produces low resistance.

When realtering the desired discrete portions of the memory semiconductor material from the low resistance condition to the high resistance condition by energy in the form of energy pulses of relatively short duration, sufficient energy is provided to heat the desired discrete portions of the semiconductor material sufficiently to realter the local order and/or localized bonding of the semiconductor material back to a less ordered condition, such as back to its substantially disordered and generally amorphous condition of low resistance, which is frozen in. These same explanations apply where the normal condition of the memory semiconductor material is the low resistance or conducting condition and where the desired discrete portions thereof are altered to the high resistance or insulating condition.

In the memory semiconductor materials of this invention, it is found that the changes in local order and/or localized bonding as discussed above, in addition to providing changes in electrical resistance, they also provide changes in capacitance and dielectric constant, in refraction, surface reflection, absorption and transmission of electromagnetic energy, such as light or the like, and in particle scattering properties or the like.

The energy applied to the memory semiconductor material for altering and realtering the desired discrete portions thereof may take various forms, as for example, electrical energy in the form of voltage and current, beam energy, such as electromagnetic energy in the form of radiated heat, photoflash lamp light, laser beam energy or the like, particle beam energy, such as electron or proton beam energy, energy from a high voltage spark discharge or the like, or energy from a heated wire or a hot air stream or the like. These various forms of energy may be readily modulated to produce narrow discrete energy pulsations of desired duration and of desired intensity to effect the desired alteration and realteration of the desired discrete portions of the memory semiconductor material, they producing desired amounts of localized heat for desired durations for providing the desired pattern of information in the film or layer of the memory semiconductor material.

The pattern of information so produced in the memory semiconductor film or layer described remains permanently until positively erased, so that it is at all times available for retrieval purposes. The invention is, therefore, particularly advantageous for various memory applications. Also, by varying the energy content of the various aforesaid forms of energy used to set and reset desired discrete areas of the memory semiconductor material, the magnitude of the resistance and the other properties referred to can be accordingly varied with some memory materials.

Various ways for retrieving the information from the film or layer may be utilized. For example, retrieval may be afforded by determining the electrical resistance, capacitance, dielectric constant, index of light refraction, surface reflectance, light absorption and light transmission and particle scattering properties of the desired portions of the film or layer of memory semiconductor material, or by detection or use of electrical charges applied to the film or layer since the film or layer may be electrically charged at those portions thereof which are in the high resistance or insulating condition. In this latter case, triboelectric or other charged ink or pigment containing particles may be adhered to the electrically charged portions of the film or layer and then transferred and affixed to a receiving surface such as paper or the like, or the charges on the film or layer of memory semiconductor material may be transferred to another charge receiving surface which in turn receives the triboelectric or other charged ink or pigment containing particles. Where the degree of the insulation or high resistance qualities of discrete portions of the memory layer are varied in the printing application of the invention, the charge adhering thereto and the tone or shade of the printing can be varied accordingly. An electron beam can also be utilized for information retrieving purposes, the beam being reflected in accordance with the conditions of the various portions of the film or layer of the memory material. The film or layer of memory material described above may take the form of a sheet or tape or be affixed to the periphery of a roll, cylinder, drum or the like, as desired.

Other objects, advantages and features of this invention will become apparent to those skilled in the art upon reference to the accompanying specification, claims and drawings in which:

FIG. 2 is a diagrammatic illustration similar to FIG. 1 but illustrating the applied energy as energy in the form of a beam, such as a laser beam, electron beam or the like;

FIG. 4 is a view similar to FIG. 3 but showing the applied energy in the form of a beam, such as a laser beam, electron beam or the like;

Figure 9:
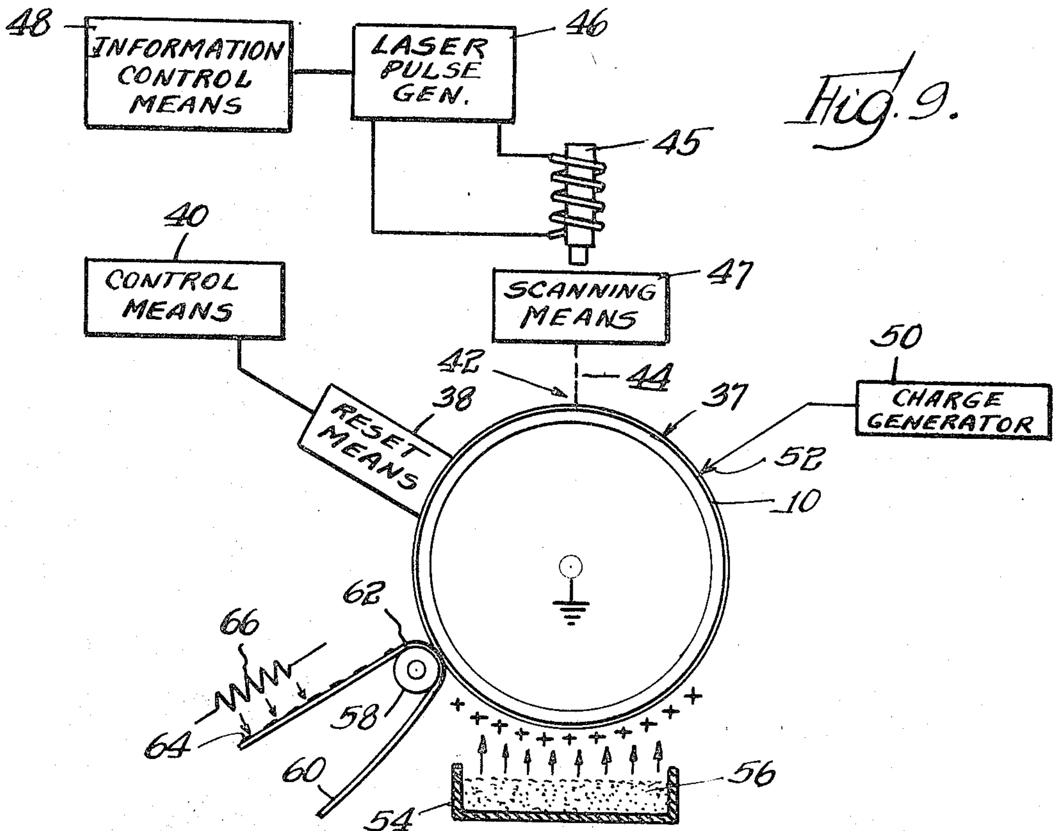
Figures 10, 11:
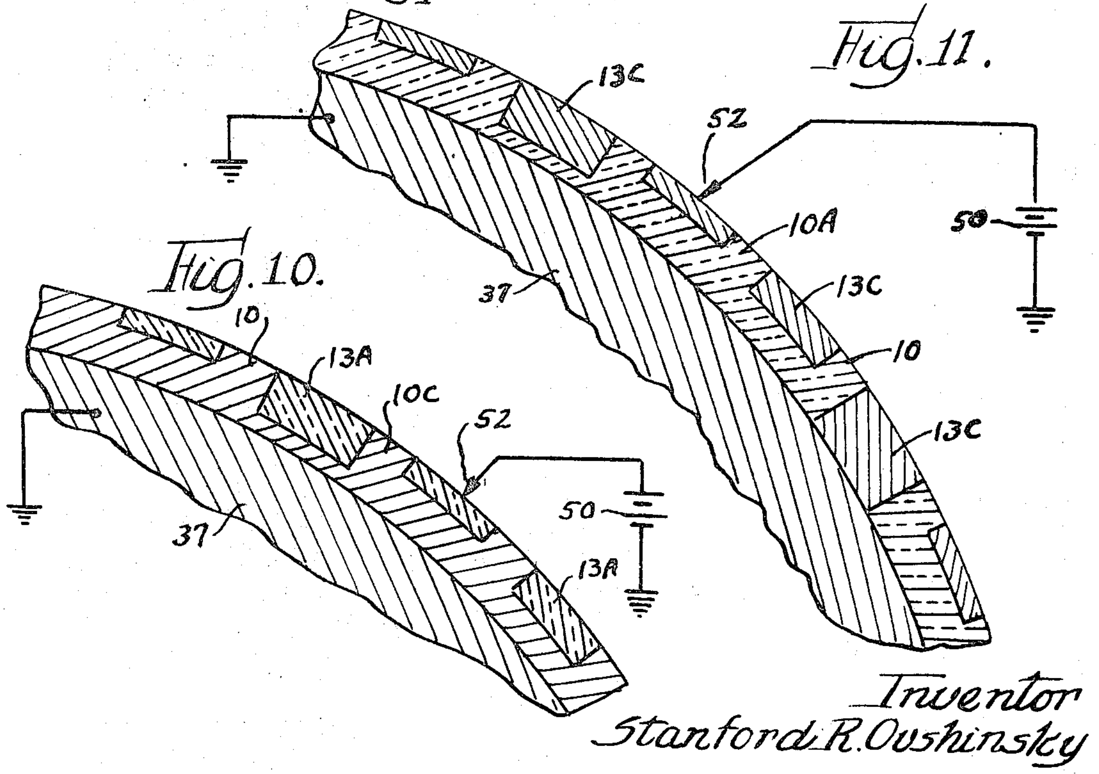
Figures 12, 13, 14, 15:
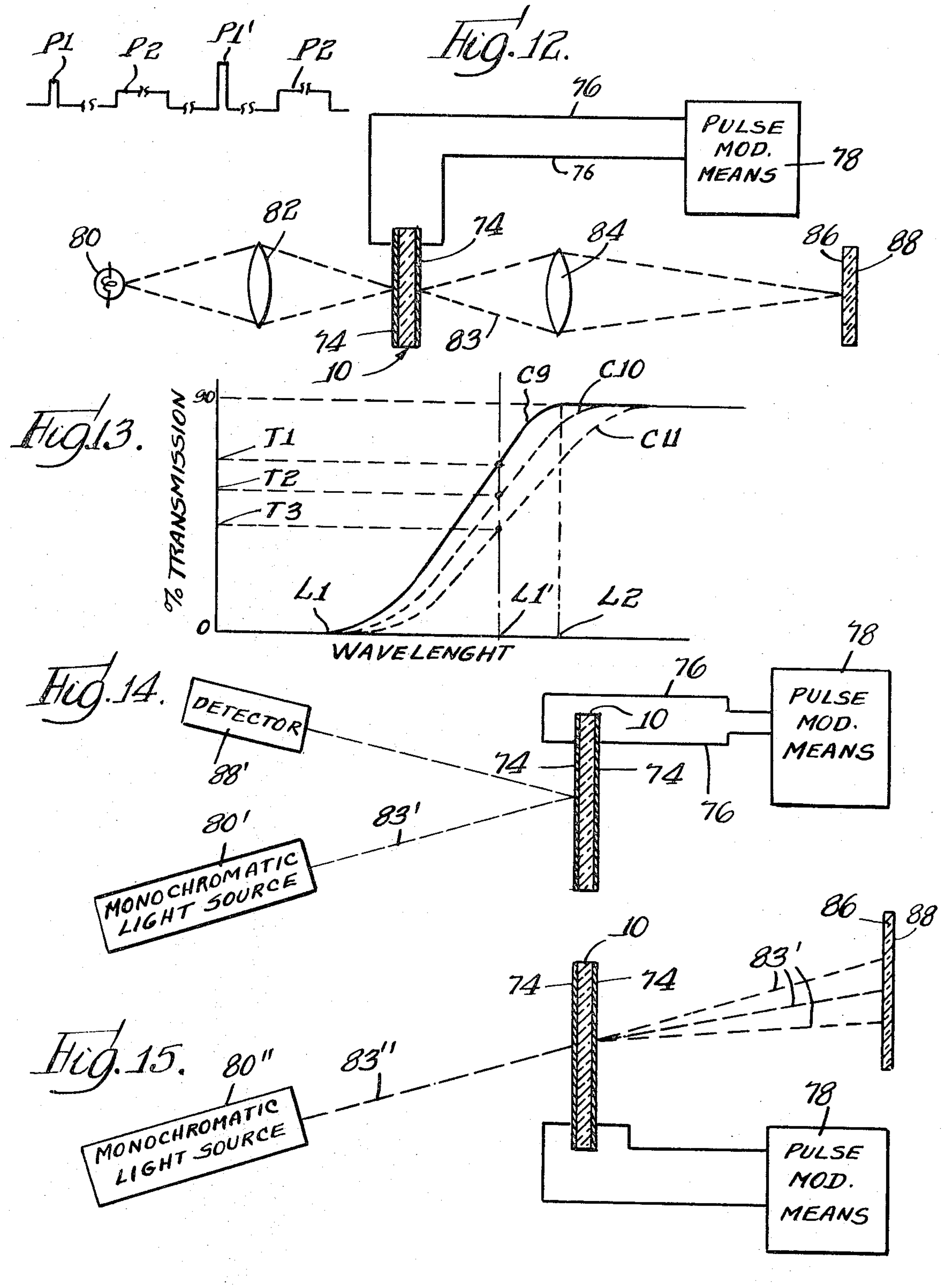

FIG. 9 is a diagrammatic illustration showing a further form of this invention wherein the layer or film of memory material is reset to a normal low resistance condition and wherein desired portions of the layer are altered to a high resistance insulating condition by energy in the form of a beam, wherein an electrical charge is applied to the layer or film and particularly to those portions of the layer or film which are in the high resistance insulating condition, wherein triboelectric particles are adhered to the electrical charges on the layer or film and wherein said adhered triboelectric particles are transferred and affixed to a receiving surface such as paper or the like;

FIG. 10 is an enlarged sectional view through a portion of the drum surface shown in FIG. 9, illustrating an exemplary method of applying charge to the surface of the layer or film;

FIG. 11 is a view similar to FIG. 10 but illustrating the film or layer to be normally in the high resistance insulating condition;

FIG. 12 illustrates the use of adaptive memory material as a light modulating means when monochromatic light is directed therethrough and the light transmission characteristic of the material is varied by applying thereto current pulses of varying energy content;

FIG. 13 shows a series of curves illustrating the variation in the light transmission characteristics of a layer of adaptive memory material, which has been subjected to current pulses of varying energy content, with variation in wavelength of the light directed therethrough;

FIG. 14 illustrates the use of adaptive memory material as a light modulating means when monochromatic light is directed therethrough and the light reflectance characteristic of the material is varied by applying thereto current pulses of varying energy content; and FIG. 15 illustrates the use of a layer of adaptive memory material as a variable light deflecting means caused by the variation in the index of refraction of the material with the variation in the energy content of current pulses fed therethrough.

Figure 1:
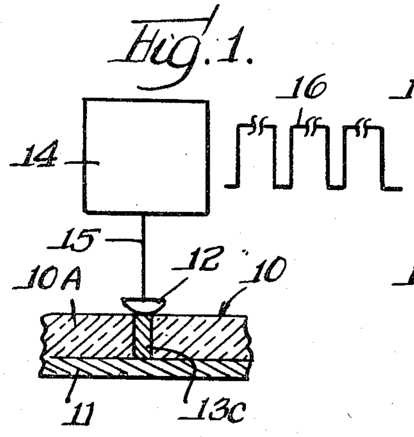
FIG. 1 is a diagrammatic illustration showing a film or layer of memory semiconductor material generally in a high resistance condition with energy in the form of electrical energy applied thereto for altering desired discrete portions of the film or layer from the stable high resistance condition to a stable low resistance condition.
Figure 3:
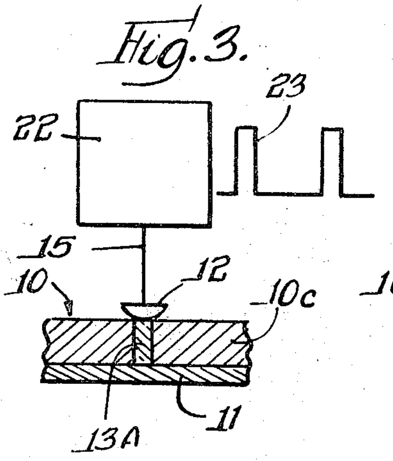
FIG. 3 is a diagrammatic illustration showing a film or layer of memory semiconductor material generally in a low resistance condition with energy in the form of electrical energy applied thereto for altering desired discrete portions of the film or layer from the stable low resistance condition to a stable high resistance condition.

Referring now to FIGS. 1 and 3, the film or layer of memory semiconductor material is generally designated at 10, it being shown in FIG. 1 at 10A as being in a stable high resistance insulating condition and in FIG. 3 at 10C as being in a stable low resistance conducting condition. The memory semiconductor material 10 is capable of having discrete portions thereof reversibly altered between the stable high resistance insulating condition and a stable low resistance conducting condition. The memory semiconductor material of the film or layer is preferably a polymeric material which, in a stable manner, may be normally in either of these conditions and a large number of different compositions may be utilized. As for example, the memory semiconductor material may comprise tellurium and germanium at about 85% tellurium and 15% germanium in atomic percent with inclusions of some oxygen and/or sulphur. Another composition may comprise $Ge_{15}As_{15}Se_{70}$. Still other compositions may comprise $Ge_{15}Te_{81}S_2$ and $P_2$ or $Sb_2$ and $Ge_{15}Se_{81}S_2$ and $P_2$ or $Sb_2$. Further compositions which are also effective in accordance with this invention may consist of the memory materials disclosed in Stanford R. Ovshinsky U.S. Pat. No. 3,271,591, granted on Sept. 6, 1966 (such materials being sometimes referred to therein as Hi-Lo and Circuit Breaker device materials). By appropriate selection of compositions and thicknesses of the films or layers, desired resistances in the low and high resistance conditions may be obtained.

The constituents of the memory semiconductor materials may be heated in a closed vessel and agitated for homogeneity and then cooled into an ingot. Layers or films may be formed from the ingot by vacuum deposition or sputtering or the like. In FIGS. 1 and 3 the film or layer 10 of memory semiconductor material is shown as being deposited on a substrate 11 of electrically conductive material such as refractory metals, including tungsten, tantalum, molybdenum, columbium or the like, or metals, such as stainless steel, nickel, chromium or the like.

To alter the stable high resistance condition of the film or layer 10A to a low resistance condition in desired discrete portions thereof as indicated at 13C, electrical energy may be applied to the film or layer 10 as indicated in FIG. 1. Here, an electrode 12 is powered by a voltage source 14 through a conductor 15 for producing a voltage across the layer 10A between the electrode 12 and the substrate 11. When a voltage above a theshold voltage value is applied, a filament or path of low resistance is established between the electrode 12 and the substrate 11, and in the formation of this path of low resistance, heat is generated therein due to the current flow therethrough to raise the temperature of the semiconductor material in the path to at least a transition temperature. This increase in temperature, above the transition temperature for a time interval, among other things, operates to cause the local order and/or localized bonding of the semiconductor material in the path to be altered toward a more ordered condition. There must be sufficient energy, i.e. sufficient current must flow in this path for a sufficient period of time, for example, a millisecond or so, for maintaining the temperature above the transition temperature for the time interval to allow this effect to take place and stabilize, so that the low resistance condition will be frozen in and remain after the current flow is terminated and the conducting path cooled, as indicated at 13C. The power source 14 for applying this voltage may be a controlled pulse source for producing voltage pulses of desired configuration and sufficient width, as indicated at 16, or it may be a source for producing a more or less continuous voltage.

The electrode 12 may be moved in one direction with respect to the layer 10 and the layer 10 may be moved in a different direction with respect to the electrode 12, so as to provide a traversing of the layer 10 by the electrode in both the X and Y directions. In this way, a desired continuous pattern of low resistance region may be formed in the layer 10 if the voltage source continuously is applied to the layer 10 or a discontinuous pattern of low resistance regions may be formed in the layer 10 if the voltage source produces a pulsed output. Accordingly, desired discrete portions of the layer 10A may be altered from a high resistance condition to a low resistance condition for the purpose of producing and storing information in the layer. Since the desired portion 13C of the layer 10A is in a low resistance condition, it will remain in this condition until such time as it is positvely realtered back to the high resistance condition. There is, therefore, a permanent storing of the information in the layer 10A.

Figure 2:
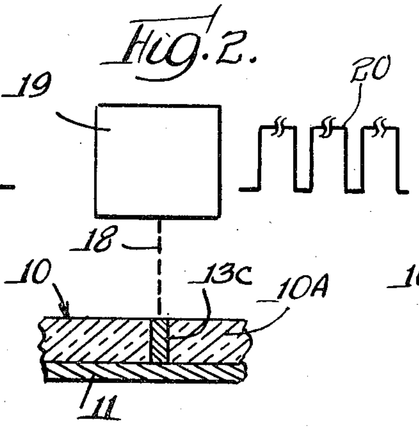

FIG. 2 shows the energy in the form of a beam 18, such as a laser beam, an electron beam, or the like, powered by a controlled pulse source 19 which is pulsed as shown at 20. The beam 18 operates to heat at least to a transition temperature and alter the portions of the layer 10A impinged thereby to a low resistance condition. The duration of the pulses 20 is sufficiently long, for example, a millisecond or so, so that a low resistance condition is produced and frozen in the discrete portion 13C of the layer 10A struck by the beam. In all other respects the arrangement of FIG. 2 is like that of FIG. 1 and, accordingly, a further description is not necessary. Suffice it to say that in both instances desired discrete portions 13C of the semiconductor layer 10A are altered from the stable high resistance condition to a stable low resistance condition in desired patterns.

In FIG. 3 the semiconductor layer 10 on the conducting substrate 11 is shown at 10C to be initially in a low resistance condition. Here, an electrode 12 connected by a conductor 15 to a current source 22 is utilized for altering the initially low resistance condition of the layer 10C at selected desired discrete portions 13A into a high resistance condition. Here, high amplitude current pulses indicated at 23 are applied to the electrode 12 for a short interval of time, for example, a microsecond or so, for heating the material between the electrode 12 and the substrate 11 to a high temperature in a short period to provide the high resistance condition at 13A. The short current pulses 23 are spaced relatively far apart and so when the current pulses are interrupted, there is adequate time for the heated desired discrete portion of the layer to rapidly cool and freeze in the high resistance condition at 13A. Here, as above, the electrode 12 and the layer 10 may be moved with respect to each other to provide a pattern of desired portions of the layer which are in a different condition from the condition of the layer, namely, in the substantially high resistance condition. Thus, the arrangement of FIG. 3 is substantially opposite to the arrangement of FIG. 1.

Figure 4:
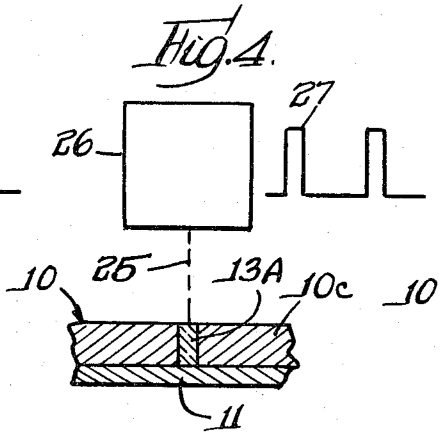

FIG. 4 is like FIG. 3 except that it differs from FIG. 3 in substantially the same way as FIG. 2 differs from FIG. 1. In FIG. 4 the energy for altering the low resistance condition of the layer 10C to the high resistance condition 13A is accomplished by energy of a beam 25, such as a laser beam, an electron beam or the like. The beam 25 is pulsed by a controlled beam generator 26 for producing beam pulses of short duration as indicated at 27.

Figure 7:
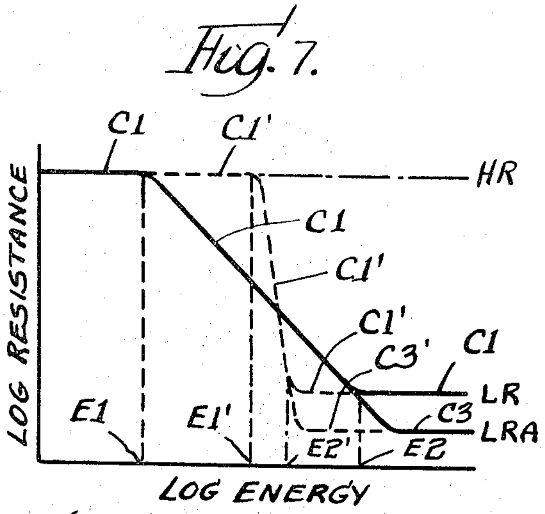
FIG. 7 illustrates the variation in resistance with applied energy on logarithmic scales of two different memory semiconductor materials from a high resistance condition to low resistance conditions by the application of energy pulses of long duration and low amplitude.

When any pulses of electrical or other energy of fixed energy content are used for setting and resetting the layer 10 betwen high resistance and low resistance conditions, the high and low resistance values of the portions of the layer effected are usually consistently the same. (The energy content of a current pulse is a function of the square of the amplitude of the current pulse multiplied by the resistance through which it flows and the duration of current flow.) For most applications, the relative values of the resistance of the material in the high and low resistance conditions referred to are many orders of magnitude apart so that the high resistance condition is effectively an insulating condition and the low resistance condition is effectively a condition where the portion of the material affected acts like a conductor (i.e. it may have an insignificant resistance). For many of the memory semiconductor materials disclosed in said U.S. Pat. No. 3,271,591, for all practical purposes the materials have only two stable resistance conditions as exemplified by the dotted curves C1 in FIG. 7 and C2′ in FIG. 8. FIG. 7 illustrates the semiconductor materials in the high resistance condition and the alteration of the resistance values thereof to the low resistance condition by the application of pulse energy of low amplitude and long duration and FIG. 8 illustrates the semiconductor materials in the low resistance condition and the alteration of the resistance values thereof to the high resistance condition by the application of pulse energy of high amplitude and short duration.

Referring to FIG. 7, it will be noted that when the semiconductor materials exemplified by the dotted curve C1′ are in the high resistance condition HR, which is a substantially disordered and generally amorphous condition, and one desires to alter or set the same to a low resistance condition LR, for progressively increasing pulsed energy applied to a discrete portion of the material involved in the energy region up to E1′, there is no substantial change in the value of the resistance HR of the material. However, when the energy level E1′ is exceeded, the resistance of the semiconductor material involved suddenly begins to decrease steeply to its low resistance condition LR which is reached by an energy level E2′ which is slightly greater than the energy level E1′. In this connection for these semiconductor materials there can be a rapid change in the local state and/or local bonding of the semiconductor material between the energy levels E1′ and E2′ to cause a rapid alteration from the substantially disordered and generally amorphous condition of high resistance HR to the more ordered condition of low resistance LR. As an example, in a typical semiconductor material, the resistance may be altered from a resistance value of about $10^6$ ohms to about $10^2$ ohms by a current pulse of about 1 millisecond duration and having an amplitude of about 5 milliamps or by an equivalent energy pulse of beam energy or the like. It has been further found that if the energy in the energy pulse is greater than that here expressed, the resistance value of the semiconductor material in its low resistance condition will be further decreased as illustrated by the curve C3′ to a lower value LRA as illustrated in FIG. 7 where the current or equivalent energy amplitude may be about 50 milliamps. This increased energy amplitude can cause a still more ordered condition and/or a larger geometrical configuration of the low resistance path through the semiconductor material to provide the still lower resistance value LRA. Thus, the low resistance value may be ultimately determined by the energy amplitude of the energy pulses in altering the discrete portions of the semiconductor materials from their high resistance value to their low resistance value.

Figure 8:
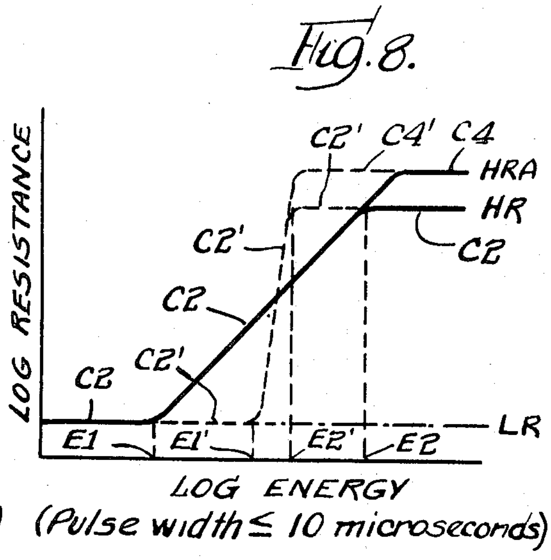
FIG. 8 illustrates the variation in resistance with applied energy on logarithmic scales of two different memory semiconductor materials from a low resistance condition to high resistance conditions by the application of energy pulses of short duration and high amplitude.

Referring now to FIG. 8, it will be noted that when the semiconductor materials exemplified by the curve C2′ are in the low resistance condition LR, which is a more ordered condition, and one desires to alter or reset the same to a high resistance condition HR, for progressively increasing pulsed energy applied to a discrete portion of the material involved in the energy region up to E1′ there is no substantial change in the value of the resistance LR of the material. However, when the energy level E1′ is exceeded, the resistance of the semiconductor material involved suddenly begins to increase steeply to its high resistance condition HR which is reached by an energy level E2′ which is slightly greater than the energy level E1′. In this connection there can be a rapid change in the local state and/or local bonding of the semiconductor material between the energy levels E1′ and E2′ to cause a rapid alteration from the more ordered condition of low resistance LR to the substantially disordered and generally amorphous condition of high resistance HR which is frozen in by the rapid cooling. As an example, in a typical semiconductor material, the resistance may be altered from a resistance value of about $10^2$ ohms to about $10^6$ ohms by a current pulse of about 2 microsecond duration and having an amplitude of about 100 milliamps or by an equilavent energy pulse of beam energy or the like. It has been further found that if the energy in the energy pulse is greater than that here expressed, the resistance value of the semiconductor material in its high resistance condition will be further increased as illustrated by the curve C4′ to a higher value HRA as illustrated in FIG. 8 where the current or equivalent energy amplitude may be about 1 amp. This increased energy amplitude can cause a still more disordered and generally amorphous condition and/or further changes in the geometrical configuration of the path through the semiconductor material to provide the still higher resistance value HRA. Thus, the high resistance value may be ultimately determined by the energy amplitude of the energy pulses in altering the discrete portions of the semiconductor materials from their low resistance value to their high resistance value.

Among the memory semiconductor materials there are some where the difference in energy level between the level where the resistance value of the material involved begins to change and the level where the ultimate resistance value is reached is relatively large, such energy levels being indicated at E1 and E2 in FIGS. 7 and 8 and the curves for such materials being indicated at C1 and C2 in FIGS. 7 and 8, respectively. Such materials will be referred to herein as "adaptive memory materials." It is possible that the rate of changing the local order and/or localized bonding in these memory semiconductor materials to alter the materials between their substantially disordered and generally amorphous condition of high resistance and their more ordered condition of low resistance is slower than in the other memory semiconductor materials and that the transition temperatures at which such alterations take place are not so sharp or pronounced. As a result, the curves C1 and C2 between the energy levels E1 and E2 in FIGS. 7 and 8 have a more gradual slope than the dotted curves C1′ and C2′ for the other memory semiconductor materials.

Referring to FIG. 7 where the adaptive memory material C1 is in the high resistance condition HR, which is a substantially disordered and generally amorphous condition, and an energy pulse of less than E1 is applied thereto, there is no substantial change in the value of the resistance HR. However, when the energy level E1 is exceeded, the resistance of the material slowly begins to decrease along the curve C1. For a given selected energy application, the resulting resistance condition along the curve C1 may be preselected and brought about with desired resistance values between HR and LR being established. In this connection a change in the local order and/or localized bonding of this semiconductor material can take place between the energy levels E1 and E2, the amount of such change being in accordance with the particular energy level applied, to cause a selected degree of alteration from the substantially disordered and generally amorphous condition of high resistance HR toward the more ordered condition of low resistance LR which is frozen in. As an example, in a typical adaptive memory semiconductor material, the resistance may be altered from a resistance value of about $10^6$ ohms to about $10^2$ ohms by a current pulse of about 1 millisecond duration and having an amplitude of about 5 milliamps or by an equivalent energy pulse of beam energy or the like. To obtain an intermediate resistance value along the curve C1 between HR and LR, the applied energy may be between about $10^{-9}$ and about $10^{-6}$ Joules, the appropriate energy being determined by appropriate selection of pulse duration and amplitude. As in the other semiconductor materials, the resistance value of the semiconductor material may be further reduced to LRA as indicated by the curve C3 where the current or equivalent energy amplitude may be about 50 milliamps.

Referring now to FIG. 8 where the adaptive memory material is in the low resistance condition LR, which is the more ordered condition, and an energy pulse of less than E1 is applied thereto, there is no substantial change in the value of the resistance LR. However, when the energy level E1 is exceeded, the resistance of the material slowly begins to increase along the curve C2. For a given selected energy application, the resulting resistance condition along the curve C2 may be preselected and brought about with desired resistance values between LR and HR being established. In this connection a change in the local order and/or local bonding of this semiconductor material may take place between the energy levels E1 and E2 to cause alteration from the more ordered condition of low resistance LR toward the substantially disordered and generally amorphous condition which is frozen in by the rapid cooling. The amount of such change is in accordance with the energy level applied, a selected degree of alteration from the more ordered condition toward the substantially disordered and generally amorphous condition being brought about and frozen in. As an example, in a typical adaptive memory semiconductor material, the resistance may be changed from a resistance value of about $10^2$ ohms to about $10^6$ ohms by a current pulse of about 2 microsecond duration and having an amplitude of about 100 milliamps, or by an equivalent energy pulse of beam energy or the like. To obtain an intermediate resistance value along the curve C2 between LR and HR, the applied energy may be between about $10^{-8}$ and about $10^{-5}$ Joules, the appropriate energy being determined by appropriate selection of pulse duration and amplitude. As in the other semiconductor materials, the resistance value of the semiconductor material may be further increased to HRA as indicated by the curve C4 where the current or equivalent energy amplitude may be about 1 amp.

Thus, by utilizing energy pulses of long duration and small amplitude and of preselected energy values, desired discrete portions of an adaptive memory material of high resistance may have their resistance values selectively decreased to desired values, and by utilizing energy pulses of short duration and large amplitude and of preselected energy values, desired discrete portions of an adaptive memory material of low resistance may have their resistance values selectively increased to desired values. It has also been discovered that the effects of successive application of discrete amounts of energy upon these memory materials are cumulative so that the successive applications of a given amount of energy will have approximately the same effect as a single application of energy having the same total energy content.

Adaptive memory material compositions can vary widely. They generally contain, in addition to Group IV and/or VI semiconductor materials forming chalcogenide glasses (oxygen, sulphur, selenium, tellurium, silicon, germanium, tin), low molecular weight Group V materials such as phosphorous. When phosphorus is replaced by higher molecular weight Group V elements (arsenic, antimony, etc.) the resistance energy curve becomes more steep.

Figure 5:
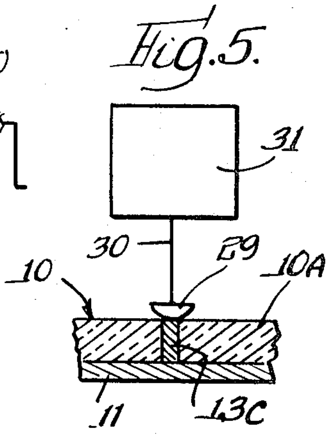
FIG. 5 is a diagrammatic illustration showing one manner of retrieving information from the layer or film of memory material in FIGS. 1 and 2 where the retrieval is by measuring the electrical resistance of discrete portions of the layer or film or some other property thereof.

The information stored in the layer 10 of memory semiconductor material may be retrieved in various ways. FIG. 5 illustrates one way of retrieval and it consists of a property sensing means (like an electrode 29) adjacent the semiconductor layer 10 and connected by a connection 30 to a meter or the like 31. The meter 31 and the property sensing means 29 operate to sense the electrical resistance, dielectric constant or other variable property thereof (such as the light reflectance or light scattering property) of the layer. Thus, if the property sensing means 29 is an electrode which contacts a portion of the layer and the meter 31 measures current flow between electrode 29 and substrate 11, the meter will register little or no current flow when the electrode 29 contacts a high resistance portion 10A of the layer and will register a large current flow when the electrode 29 contacts a low resistance portion 13C of the layer. Accordingly, by scanning the layer 10 the meter 31 will read out and retrieve the information stored in the layer.

Figure 6:
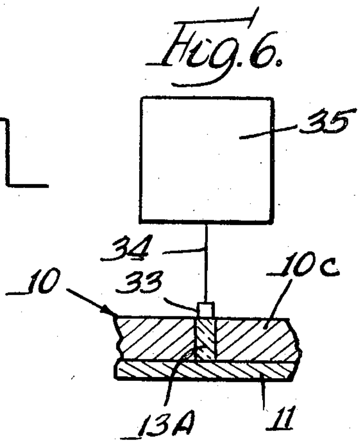
FIG. 6 shows a manner of retrieving information from the layer or film of memory material shown in FIGS. 3 and 4 wherein the capacitance of the discrete portions of the layer or film is measured.

FIG. 6 illustrates another manner of retrieving the information stored in the layer 10. Here, a small plate 33 contacts or is brought into close proximity to the layer 10 and it is connected through a connection 34 to a meter or the like 35 for detecting the capacitance of the layer. When the small plate 33 is adjacent a portion 13A of the layer which is in a high resistance condition, the capacitance will be high, and when it is adjacent a portion 10C of the layer which is in a low resistance condition, the capacitance will be low. Thus, by scanning the layer and determining its capacitance at the various portions thereof, the information stored in the layer may be read out and retrieved by the meter 35.

FIG. 9 diagrammatically illustrates an arrangement wherein the retrieval of the information is accomplished by providing the layer 10 of memory material with an electric charge, adhering triboelectric particles to the charged portions of the layer and transferring such triboelectric particles to a receiving surface or carrier and affixing the same thereto. In FIG. 9 the layer 10 is carried by a rotatable drum 37 and acts as a printing plate which can print multiple copies of the information stored thereon at a high speed.

The different circumferentially spaced segments of the drum 37 are moved sequentially past a reset means 38 which may be a heater wire or other energy source which, when energized by a control means 40 (which may be a manual or computer control means), directs energy upon the entire area of each axial segment of the layer passing thereby to set the same most advantageously to a low resistance condition. On the other hand, the reset means 38 could be an energy source for setting all segments of the memory semiconductor layer 10 initially into a high resistance condition. Each reset axial segment of the memory semiconductor layer is moved past a recording station 42 where a pulsed laser beam 44, or other suitable pulsed beam of energy, is applied thereto in accordance with the pattern of information to be printed by the drum 37. The pulsating beam 44 of energy preferably scans the drum surface axially at a high speed to modify each data containing segment of the layer 10 as it passes the recording station 42 to produce a desired pattern of high and low resistance regions in the layer.

The means illustrated for producing the beam 44 is a laser diode 45 controlled by a laser pulse generator 46. The laser beam 44 under control of a beam scanning means 47 is caused to scan rapidly the length of the layer 10 on the drum at a very high speed, so that successive scanning lines of the laser beam affect closely circumferentially spaced segments or lines on the layer 10. The scanning means 47 may, for example, be a mirror system well known in the art. The energization of the laser pulse generator 46 is under control of an information control means 48 which may be a scanning photo-densitometer, a device well known in the art, which scans printed matter and develops pulses responding to the light or dark areas of the information being scanned. The scan control of the photo-densitometer may be operated in sycnhronism with the laser scanning means 47.

An electric charge generator 50 is utilized for applying electric charges to the layer 10 at 52, the charges appearing at those portions of the layer 10 which are in a high resistance condition and not appearing at those portions of the layer which are in a low resistance condition since in the latter portions the electrical charge is drained through the low resistance. The charges produced on the layer 10 are indicated by + signs. Disposed adjacent the layer 10 on the drum 37 is a container 54 of triboelectric particles 56 which are attracted from the container 40 onto the charged portions of the layer. The layer with the triboelectric particles which are adhered thereto by the electric charges pass a roller 58 carrying a receiving surface or carrier 60 such as paper or the like. The adhered triboelectric particles are transferred at the roller 58 onto the receiving surface or carrier 60 as indicated at 62 and they are affixed to the receiving surface or carrier 60 as indicated at 64 by heat applied by a heater 66. Thus, the information which is stored in the layer 10 is transferred and reproduced on the receiving surface or carrier so as to get a visual reproduction of the information produced in and stored by the layer 10.

Since a desired resistance pattern is permanently stored in the layer 10, any number of reproductions of the information may be made. However, if it be desired to erase the information from the layer, the reset means 38 is energized as described above.

If the layer 10 of memory semiconductor material on the drum 37 is a layer of adaptive memory material as previously described, and the intensity of the pulsed beam 44 is varied in accordance with the tone or shade of the printing desired, then even when the charge generator 50 evenly applies charges to the relatively high resistance portions of the layer, by the time the portion of the layer involved reaches the container 54 of triboelectric particles 56 the charge can be reduced by partial leakage thereof to a lower charge density which is a function of the resistance thereof. The density pattern of the triboelectric particles on the layer of memory material will be in accordance with the variation in charge density over the various portions thereof and the tone or shade of the printing occurring on the printing surface 60 will vary accordingly.

FIG. 10 illustrates an embodiment of the invention where the electric charge generator 50 is designed so that the charge placed upon the layer 10 of adaptive memory material is, in the first instance, applied in proportion to the resistivity of the portions of the layer involved. In such case, it is assumed that the layer 10 has a relatively low resistance as indicated at 10C and that the resistivity of those portions 13A of the layer 10 which are converted to a relatively high resistance condition by the beam 44 haxe negligible leakage and thus act ideally as the relatively leakage free insulation of discrete capacitors formed by each portion 13A thereof converted to the high resistance condition. As discussed above, the varying of the energy of the beam 44 operates to produce different degrees of resistance or insulation in discrete portions 13A of the layer 10 of adaptive memory material. The discrete high resistance portions 13A may extend through the semiconductor material 10C and may have more or less disorder and, hence, more or less resistance depending upon the amount of beam energy applied thereto, or they may extend only partially therethrough for varying distances as illustrated in FIG. 10, depending upon the amount of beam energy applied thereto, or both conditions may occur. In any event, the discrete portions 13A form discrete capacitors between the drum 37 and the outer surface of the layer or film 10, having high capacitance and high resistance compared to the low resistance of the remainder of the layer or film 10C, and having varying degrees of high resistance and capacitance depending upon the energy applied in forming the same. The discrete capacitors 13A may be charged at 52 by the charge generator 50, it being understood that the charge developed across the capacitors is proportional to the capacitance of the capacitors and the magnitude of the voltage applied thereto for charging the same. In other words, the discrete capacitors 13A may be charged to varying degrees depending upon the resistance and capacitance of the various discrete capacitors and, in this way, the density pattern of the triboelectric particles on the semiconductor layer 10 may be controlled to provide appropriate shade and tone of the printing by the apparatus of FIG. 9.

FIG. 11 illustrates an arrangement like that of FIG. 10 but, in effect, the reverse thereof. Here, the layer or film 10 of semiconductor material is normally in its relatively high resistance condition, as indicated at 10A, having negligible leakage free insulation and relatively high capacitance. Selected discrete portions 13C are altered to a relatively low resistance condition by the beam energy as discussed above, the energy of the beam operating to produce different degrees of resistance or conductivity in discrete portions 13C thereof. The discrete low resistance portions 13C may extend through the semiconductor material 10A and may have more or less order and, hence, less or more resistance depending upon the amount of beam energy applied thereto, or they may extend only partially therethrough for varying distances, as illustrated in FIG. 11, depending upon the beam energy applied thereto, or both conditions may occur. The discrete portions 13C from low resistance paths in the high resistance layer 10A, the resistance values of which may be preselected as described above, so as to preset the resistance and capacitance values of those discrete portions of the layer 10A containing the discrete portions 13C.

The layer or film 10A may be charged at 52 by the charge generator 50 in the manner discussed above, the charges at the discrete portions 13C varying with respect to the charge at the other portions of the layer or film 10A. In this way, the density pattern of the triboelectric particles on the semiconductor layer 10 may be controlled to provide appropriate shade and tone of the printing by the apparatus of FIG. 9. Generally speaking, all things being equal, the printing by the arrangement of FIG. 11 will be the negative of that of FIG. 10.

Refer now to FIGS. 12 and 13 which illustrate another application of the use of adaptive memory materials. As previously indicated, the light transmitting, light reflecting, light refracting and light scattering properties of memory semiconductor materials can be varied with the variation in energy applied thereto which progressively alters the local order and/or localized bonding thereof. FIG. 12 shows a layer 10 of memory semiconductor material having deposited on the opposite sides thereof light transparent conductive layers 74—74. These conductive layers are connected by conductors 76—76 to pulse modulating means 78 which may produce a pulse train there shown which comprises alternate short duration variable amplitude high current pulses P1, P1', etc. and fixed low current prolonged reset pulses P2 which respectively alternately set at least portions of the memory material to high resistance insulating conditions and then reset the same to a fixed low resistance condition. The current reset pulses P2 are generated by corresponding voltage pulses which exceed the threshold voltage level of the memory material involved. As previously indicated, the magnitude of the current pulses P2 are made sufficiently high and the duration thereof is sufficiently long (e.g. 100 milliseconds or more in the exemplary materials being described) so that the layer of memory material will be reset to a minimum low resistance condition independently of the high resistance condition of the portions of the layer being reset. Any light shining upon the layer 10 of memory material will be acted upon the layer in accordance with the variation in the various light transmitting, reflecting, etc. properties of the layer. In FIG. 12, an application of the memory material is shown where the amount of light transmitted through the layer 10 is varied so the layer acts as a light modulating means. A source 80 of monochromatic light having a given wavelength is shown focused by a lens 82 upon a layer 10 of memory material. The light beam 83 passing through the layer 10 is focused by a lens 84 upon a light detecting means 88 which may be a surface 86 of a light sensitive film or other medium upon which the modulated light beam is to be recorded or indicated.

FIG. 13 illustrates the variation in the light transmission characteristics of the layer 10 with variation in the wavelength of light shining through the layer. As illustrated, light having a wavelength below L1 will not be transmitted through the layer 10, light having a wavelength above L2 will be transmitted through the layer 10 to a maximum high degree, and light having a wavelength between L1 and L2 is transmitted in progressively increasing degrees with increase in the wavelength involved. For a given wavelength like L1', the degree of transmission of the light through the layer 10 depends upon the degree to which the local order and/or localized bonding of the portion of the adaptive memory material through which the light passes has been varied. This is exemplified by the series of curves C9, C10, and C11 in FIG. 13 which represent the variation in light transmission through layer 10 with the wavelength of light passing therethrough where the local order and/or localized bonding thereof has been altered progressively to increasing high resistance conditions. At the wavelength L1', the transmission characteristics of the memory material having the resistance conditions represented by the curves C9, C10 and C11 respectively have light transmission percentages T1, T2 and T3 of progressively decreasing amounts.

The light reflectance property of a layer of memory material also varies with the local order and/or localized bonding of the material. Thus, FIG. 14 shows a layer 10 of memory material with light transparent conductive electrodes 74—74 which are connected to a pulse modulating means 78 as above described. A monochromatic light source 80' directs a light beam 83' at an angle upon the layer 10, and a light detecting means 88' is provided which receives and measures the light reflected off the layer 10'.

Refer now to FIG. 15 which illustrates an application of the variation in light refraction of layer 10 of memory material with the variation in the local order and/or localized bonding thereof. A monochromatic light source 80'' is there shown positioned to direct a beam 83'' of light at an angle through the layer 10 so that the light beam will be bent to a degree depending upon the condition of the layer 10 of memory material. Pulse modulating means 78 is connected to the transparent conductive layers 74—74 thereof as in the embodiment of FIGS. 12 and 14 to vary the condition thereof as in the same manner previously described. The angle at which the light beam 83' leaves the memory material 10 will vary and accordingly strike different portions of the surface 86 of a layer or film 88 or other recording or detecting means 88.

It should be understood that numerous modifications may be made in the various forms of the invention described above without deviating from the broader aspects of the invention. For example, the broader aspects of the invention envision the transfer of charges to the layer of memory material on the drum surface which charges are, in turn, transferred to the surface to be printed which, in turn, receive triboelectric or other ink forming particles. Another variation encompassed by the broader aspects of the invention is a polygonal drum configuration comprising a number of flat peripheral faces covered with a layer of memory material so information can be readily applied to the layer by projecting a complete pattern of energy simultaneously upon a flat portion of the drum surface that no drum scanning operation is required. Where an electron beam is utilized for forming the desired discrete portions in the film or layer of the semiconductor material, it also may act as a means for electrically charging the film or layer and/or the discrete portions thereof.

What is claimed is:

1. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable charcteristic, said layer normally being in one of said conditions, selectively applying energy to said layer at any desired discrete portions thereof for altering said layer at said desired discrete portions from said one normal condition to the other condition to store information in said layer in any desired pattern, and detecting the condition of any said desired discrete portions of said layer with respect to said one normal condition of the remainder of said layer to retrieve the information stored in said layer.

2. The method as defined in claim 1 wherein said one normal condition of said layer is said one stable atomic structure condition and the condition of said desired discrete portions of said layer is said other stable atomic structure condition.

3. The method of storing and retrieving information comprising the steps of providing a layer of memory semiconductor material which is capable of having discrete portions thereof reversibly structurally altered between one stable atomic structure condition which is substantially disordered and generally amorphous with local order of localized bonding and having one detectable characteristic and another stable atomic structure condition having at least another local order or localized bonding and another detectable characteristic, said layer normally being in said other stable atomic structure condition, selectively applying energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer.

4. The method as defined in claim 1 wherein the selective application of energy to the desired discrete portions of said layer is by applying said energy in pulses.

5. The method as defined in claim 2 wherein the selective application of energy to the desired discrete portions of said layer is by applying said energy in pulses of sufficiently long duration to allow said one stable atomic structure condition to alter fixedly to said other stable atomic structure condition.

6. The method as defined in claim 3 wherein the selective application of energy to the desired discrete portions of said layer is by applying said energy in pulses of sufficiently short duration to allow said other stable atomic structure condition to alter fixedly to said one stable atomic structure condition.

7. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable charatceristic and another stable atomic structure condition having at least another local order or localized bonding and another detectable characteristic, said layer normally being in one of said conditions, selectively applying energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer, wherein the energy applied to said desired discrete portions of said layer is applied in varying amounts to vary the degree to which said desired discrete portions are reversibly structurally altered and the values of the detectable characteristics thereof.

8. The method as defined in claim 1 wherein the energy applied to the desired discrete portions of said layer is electrical energy directed through the layer.

9. The method of defined in claim 4 wherein the energy applied in pulses to the desired discrete portions of said layer is electrical energy directed through the layer.

10. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying beam energy to sai dlayer at desired discrete portions thereof for altering said layer at said desired discrete portions from said one normal condition to the other condition to store information in said layer and detecting the condition of said desired discrete portions of said layer with respect to said one normal condition of the remainder of said layer to retrieve the information stored in said layer.

11. The method as defined in claim 10 wherein the beam energy applied to said layer is applied in pulses.

12. The method as defined in claim 1 wherein the detection of the condition of said desired discrete portions of said layer with respect to said one normal condition of the remainder of said layer to retrieve the information stored in said layer is accomplished by detecting the relative electrical resistances through said layer at said desired discrete portions of said layer and at the remainder of said layer.

13. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying energy to said layer at desired discrete portions thereof for altering said layer at said desired discrete portions from said one normal condition to the other condition to store informaton in said layer, and detecting the condition of said desired discrete portions of said layer with respect to said one normal condition of the remainder of said layer to retrieve the information stored in said layer by detecting the relative capacitance across said layer at said desired discrete portions of said layer and the remainder of said layer.

14. The method of storing and rertrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer by applying an electrical charge to said layer for producing an electrical charge at those portions of the layer which are in said one stable atomic structure condition as distinguished from the other portions of the layer which are in said other stable atomic structure condition and which are at least less electrically charged, and detecting the electrically charged portions of said layer.

15. The method as defined in claim 14 wherein the detecting of the electrically charged portions of said layer is accomplished by applying to said layer charged pigmented particles which adhere to the electrically charged portions of said layer, and transferring said adhered particles from the electrically charged portions of said layer to a receiving surface and affixing the same thereto.

16. The method of storing and retrieving information comprising the steps of providing a layer of memory semiconductor material which is capable of having the local order or localized bonding of discrete portions thereof reversibly altered between a state providing a stable high resistance condition and a state providing a stable low resistance condition, said layer normally being in one of said conditions, selectively applying energy to said layer at desired discrete portions thereof for altering said layer at said desired discrete portions from said one normal condition to the other condition to produce and store information in said layer, and detecting the condition of said desired discrete portions of said layer with respect to said one normal condition of the remainder of said layer to retrieve the information produced and stored in said layer, wherein said one normal condition of said layer is said low resistance condition and the condition of said desired discrete portions of said layer is said high resistance condition, wherein the energy selectively applied to desired discrete portions of said layer is applied in varying amounts to vary the degree to which said local order or localized bonding is affected and the values of the high resistance of the desired discrete portions so affected, wherein the detection of the condition of said desired discrete portions of said layer with respect to said one normal condition of the remainder of said layer to retrieve the information stored in said layer is accomplished by applying an electrical charge to said layer for producing an electrical charge at those portions of the layer which are in the high resistance condition as distinguished from the other portions of the layer which are in the low resistance condition and which are not electrically charged, wherein the charge varies with the value of the high resistance condition thereof, and detecting the electrically charged portions of said layer by applying to said layer charged pigmented particles which adhere to the electrically charged portions of said layer in proportion to the charge thereon.

17. The method as defined in claim 1 including the further step of erasing the information stored in the layer by applying energy to said layer to realter the condition of said desired discrete portions of the layer to the normal condition of the layer.

18. The method as defined in claim 2 including the further step of erasing the information stored in the layer by applying energy to said layer to realter the condition of said desired discrete portions of the layer to the normal condition of the layer.

19. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer by sensing the effect of said desired discrete portions of said layer and the remainder of said layer on light.

20. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer by sensing the effect of said desired discrete portions of said layer and the remainder of said layer on an electron beam.

21. The method as defined in claim 3 including the further step of erasing the information stored in the layer by applying energy to said layer to realter the condition of said desired discrete portions of the layer to the normal condition of the layer.

22. Apparatus for storing and retrieving information comprising, a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, means for selectively applying energy to said layer at any desired discrete portions thereof for altering said layer at said desired discrete portions from said one normal condition to the other condition to store information in said layer in any desired pattern, and means for detecting the condition of any said desired discrete portions of said layer with respect to said one normal condition of the remainder of said layer to retrieve the information stored in said layer.

23. The apparatus defined in claim 22 including means for applying energy to said layer to realter the condition of said desired discrete portions of said layer to the normal condition of said layer for erasing the information stored in the layer.

24. A method of storing and retrieving information comprising the steps of providing a layer of memory semiconductor material which is capable of having portions thereof, upon momentary application of varying amounts of energy thereto, progressively and reversibly structurally altered between one stable atomic structure condition of high electrical resistance which is substantially disordered and generally amorphous with local order of localized bonding and having one detectable characteristic when subjected to electromagnetic energy and another stable atomic structure condition of low electrical resistance having at least another local order or localized bonding and another detectable characteristic when subjected to electromagnetic energy so the electrical resistance and detectable characteristic thereof can be stably adjusted, at least a portion of said layer initially being in a reference electrical resistance condition, applying a given amount of energy to said layer portion for altering said layer portion from said reference electrical resistance condition to another electrical resistance condition to store information in said layer portion, and detecting the altered condition of said layer portion to retrieve the information stored in said layer by directing electromagnetic energy upon said layer portion and sensing the effect thereof on said electromagnetic energy.

25. The method of claim 24 wherein said detecting step comprises sensing the amount of electromagnetic energy passing through said layer portion.

26. The method of claim 24 wherein said detecting step comprises passing a beam of electromagnetic energy at an angle through said layer portion and sensing the degree to which the electromagnetic energy is bent by the layer portion.

27. The method of claim 24 wherein said detecting step comprises sensing the degree to which the electromagnetic energy is reflected by the layer portion.

28. The method of claim 24 wherein said detecting step comprises sensing the degree to which the electromagnetic energy is scattered by the layer portion.

29. The method of claim 24 wherein said layer portion of memory semiconductor material is stably structurally alterable from any one of a number of different relatively low electrical resistance conditions to any one of a number of different relatively high electrical resistance conditions by application thereto of energy of a first waveform type of varying energy content, and wherein said layer portion of memory semiconductor material is stably alterable from said different relatively high electrical resistance conditions to any one of a number of different relatively low electrical resistance conditions by application thereto of energy of a second waveform type of varying energy content, and said energy applying step comprising sequentially applying said energy of different waveform types to said layer portion of memory semiconductor material.

30. The method of claim 29 wherein said energy of said first waveform type is at least one short burst of energy, and said energy of said second waveform type is at least one relatively long application of energy.

31. The method of claim 24 wherein said layer portion of memory semiconductor material is stably structurally alterable from the reference electrical resistance condition to any one of a number of different electrical resistance conditions by application thereto of energy of a first waveform type of varying energy content, and wherein said layer portion of memory semiconductor material is stably structurally alterable from said different electrical resistance conditions to said reference electrical resistance condition by application thereto of energy of a second waveform type of a given energy content, and said energy applying step comprising sequentially applying said energy of different waveform types to said layer portion of memory semiconductor material to alter the same between said electrical resistance conditions.

32. A method of storing and retrieving information comprising the steps of providing a layer of memory semiconductor material which is capable of having discrete portions thereof, upon momentary application of varying amounts of energy thereto, progressively and reversibly structurally altered between one stable atomic structure condition of high electrical resistance which is substantially disordered and generally amorphous with local order of localized bonding and another stable atomic structure condition of low resistance having at least another local order or localized bonding so the electrical resistance thereof can be stably adjusted, said layer initially being in a reference electrical resistance condition, applying varying amounts of energy to said layer at selected desired discrete portions thereof for altering said layer at said desired discrete portions from said one reference electrical resistance condition to varying electrical resistance conditions to store information in said layer, and detecting the altered condition of said desired discrete portions of said layer to retrieve the information stored in said layer by electrostatically charging said layer so that the charge on the various portions of the layer is a function of the resistance condition thereof, and indicating the degree to which the various portions are charged.

33. The method of claim 32 wherein said indicating step is the application to said layer of memory semiconductor material of ink forming particles of opposite charge to the charge on said layer so the density of such particles on said layer varies with the charge on said layer.

34. Apparatus for storing and retrieving information comprising, a rotatable drum, a layer of memory semiconductor material on the periphery of the drum which layer is capable, when given amounts of energy are applied thereto, of having discrete portions thereof reversibly structurally altered between one stable atomic structure condition of high electrical resistance which is substantially disordered and generally amorphous with local order or localized bonding and another stable atomic structure condition of low electrical resistance having at least another local order or localized bonding, said layer of memory semiconductor material normally being in one of said conditions; first means opposite one circumferential section of the drum for selectively applying a first amount of energy to said layer of memory semiconductor material at desired discrete portions thereof which alters said layer at said desired discrete portions from said one normal condition to the other condition; means positioned along the drum periphery and spaced from said first means for applying selectively to desired discrete portions of said layer in one of said resistance conditions imprint producing means; and means positioned along said drum periphery and spaced from both of the aforesaid means and responsive to said imprint producing means on the selected desired discrete portions of said drum for producing a corresponding imprint on a surface to be printed.

35. The apparatus of claim 34 wherein said means for applying said imprint producing means is a means for applying electrical charges to the high resistance portions of said layer of memory semiconductor material, and said means responsive to said imprint producing means includes means for applying to said charged high resistance portions of said layer ink forming particles having a charge opposite to said charges and for transferring said ink forming particles to said surface to be printed.

36. The apparatus of claim 34 wherein there is provided a second energy applying means, located at the periphery of the drum between the last mentioned means and said first means, for selectively applying a second amount of energy to said layer of memory semiconductor material which resets said portions of said layer of memory semiconductor material in said other resistance condition to said one resistance condition, to permit the application of a new pattern of high and low resistance portions on said layer of memory semiconductor material.

37. The apparatus of claim 34 wherein said first energy applying means is a pulse beam of energy which scans the drum surface axially thereof.

38. The apparatus of claim 36 wherein said first energy applying means is a means for providing a pulsed beam of energy and said second energy applying means is a means for supplying heat radiation to said layer of memory semiconductor material.

39. The apparatus of claim 36 wherein said first energy applying means provides a pulsating energy beam which scans the drum surface, said discrete portions of said layer of memory semiconductor material in said one resistance condition is alterable to said other resistance condition by very short bursts of said energy provided by said first energy applying means, said discrete portions of said layer of memory semiconductor material being resettable to said one resistance condition by application of energy for a relatively prolonged period, said second energy applying means simultaneously applying its energy to an entire axial segment of the drum surface.

40. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer by directing electromagnetic energy upon said layer, and sensing the effect of said desired discrete portions of said layer on said electromagnetic energy.

41. The method as defined in claim 40 wherein the sensing step comprises sensing the amount of electromagnetic energy passing through said desired discrete portions of said layer and the remainder of said layer.

42. The method as defined in claim 40 wherein the sensing step comprises sensing the degree of refraction of the electromagnetic energy passing through said desired discrete portions of said layer and the remainder of said layer.

43. The method as defined in claim 40 wherein the sensing step comprises sensing the degree to which the electromagnetic energy is reflected by said desired discrete portions of said layer and the remainder of said layer.

44. The method as defined in claim 40 wherein the sensing step comprises sensing the degree of scattering of the electromagnetic energy by said desired discrete portions of said layer and the remainder of said layer.

45. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying electromagnetic energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer.

46. The method of storing and retrieving information comprising the steps of providing a layer of memory semiconductor material which is capable of having discrete portions thereof reversibly structurally altered between one stable atomic structure condition which is substantially disordered and generally amorphous with local order or localized bonding and having one detectable characteristic and another stable atomic structure condition having at least another local order or localized bonding and another detectable characteristic, said layer normally being in one of said conditions, selectively applying electron beam energy to said layer at desired discrete portions thereof for altering said layer at said desired discrete portions from said one normal condition to the other condition to store information in said layer, and detecting the condition of said desired discrete portions of said layer with respect to said one normal condition of the remainder of said layer to retrieve the information stored in said layer.

47. The method as defined in claim 1 wherein said other stable atomic structure condition is more ordered toward a crystalline like condition.

48. The method of storing and retrieving information comprising the steps of providing a film of semi-conductor material which is capable of having discrete portions thereof of reversibly altered between a substantially disordered generally amorphous condition of high resistance and a more ordered cyrstalline like condition of low resistance, said film normally being in one of said conditions, selectively applying energy to said film at any desired portions thereof for altering said film at said desired portions from said one normal condition to the other condition to store information in said film in any desired pattern, and detecting the condition of any said desired portions of said film with respect to said one normal condition of the remainder of said film to retrieve the information stored in said film.

49. The method of storing and retrieving information comprising the steps of providing a film of semi-conductor material which is capable of having discrete portions thereof of reversibly altered between a substantially disordered generally amorphous condition of high resistance and a more ordered crystalline like condition of low resistance, said film normally being in said more ordered crystalline like condition of low resistance, selectively applying energy to said film at desired portions thereof for altering said film at said desired portions from said one normal condition to the other condition to store information in said film, and detecting the condition of said desired portions of said film with respect to said one normal condition of the remainder of said film to retreve the information stored in said film.

50. The method of storing and retrieving information comprising the steps of providing a film of semi-conductor material which is capable of having discrete portions thereof reversibly altered between a substantially disordered generally amorphous condition of high resistance and a more ordered crystalline like condition of low resistance, said film normally being in one of said conditions, selectively applying beam energy to said film at desired portions thereof for altering said film at said desired portions from said one normal condition to the other condition to store information in said film, and detecting the condition of said desired portions of said film with respect to said one normal condition of the remainder of said film to retrieve the information stored in said film.

51. The method as defined in claim 50 wherein the beam energy is applied in pulses to the desired portions of said film.

52. The method of storing and retrieving information comprising the steps of providing a film of semiconductor material which is capable of having discrete portions thereof reversibly altered between a substantially disordered generally amorphous condition of high resistance and a more ordered crystalline like condition of low resistance, said film normally being in one of said conditions, selectively applying energy to said film at desired portions thereof for altering said film at desired portions thereof from said one normal condition to the other condition to store information in said film, and detecting the condition of said desired portions of said film with respect to said one normal condition of the remainder of said film to retrieve the information stored in said film by applying an electrical charge to said film for producing an electrical charge at those portions of the film which are in the substantially disordered and generally amorphous condition as distinguished from the other portions of the film which are in the more ordered crystalline like condition and which are not electrically charged, and determining the electrically charged portions of said film.

53. The method as defined in claim 52 wherein the determination of the electrically charged portions of said film is accomplished by applying to said film triboelectric powder which adheres to the electrically charged portions of said film, and transferring said adhered powder from the electrically charged portions of said film to a receiving surface and affixing the same thereto.

54. The method as defined in claim 49 including the further step of erasing the information produced and stored in the film by applying energy to said film to realter the condition of said desired portions of the film to the normal condition of the film.

55. The method of storing and retrieving information comprising the steps of providing a film of semiconductor material which is capable of having discrete portions thereof reversibly altered between a substantially disordered generally amorphous condition of high resistance and a more ordered crystalline like condition of low resistance, said film normally being in one of said conditions, selectively applying energy to said film at desired portions thereof for altering said film at said desired portions from said one normal condition to the other condition to store information in said film, and detecting the condition of said desired portions of said film with respect to said one normal condition of the remainder of said film to retrieve the information stored in said film by sensing the effect of said desired portions of said film and the remainder of said film on light.

56. The method of storing and retrieving information comprising the steps of providing a film of semiconductor material which is capable of having discrete portions thereof reversibly altered between a substantially disordered generally amorphous condition of high resistance and a more ordered crystalline like condition of low resistance, said film normally being in one of said conditions, selectively applying energy to said film at desired portions thereof for altering said film at said desired portions from said one normal condition to the other condition to store information in said film, and detecting the condition of said desired portions of said film with respect to said one normal condition of the remainder of said film to retrieve the information stored in said film by sensing the effect of said desired portions of said film and the remainder of said film on an electron beam.

57. Apparatus for storing and retrieving information comprising, a film of semiconductor material which is capable of having discrete portions thereof reversibly altered between a substantially disordered generally amorphous condition of high resistance and a more ordered crystalline like condition of low resistance, said film normally being in one of said conditions, means for selectively applying energy to said film at any desired portions thereof for altering said film at said desired portions from said one normal condition to the other condition to store information in said film in any desired pattern, and means for detecting the condition of any said desired portions of said film with respect to said one normal condition of the remainder of said film to retrieve the information stored in said film.

58. The apparatus defined in claim 57 including means for applying energy to said film to realter the condition of said desired portions of said film to the normal condition of said film for erasing the information stored in the film.

References Cited

UNITED STATES PATENTS

| | | | |
|---|---|---|---|
| 3,119,099 | 1/1964 | Biernat | 340—173 |
| 3,445,823 | 5/1969 | Petersen | 340—173 |
| 2,901,662 | 8/1959 | Nozick | 340—173 X |
| 2,985,757 | 5/1961 | Jacobs et al. | 340—173 X |
| 3,054,961 | 9/1962 | Smith | 340—173 X |
| 3,241,009 | 3/1966 | Dewald et al. | 317—235 X |
| 3,341,825 | 9/1967 | Schrieffer | 340—173 |
| 3,355,289 | 11/1967 | Hall et al. | 96—1.5 X |
| 3,469,154 | 9/1969 | Scholer | 317—235 X |

TERRELL W. FEARS, Primary Examiner

U.S. Cl. X.R.

96—1.5; 307—238, 278, 310, 311; 346—74, 107; 355—17